United States Patent [19]

Miyashita et al.

[11] Patent Number: 5,407,887
[45] Date of Patent: Apr. 18, 1995

[54] POROUS CARRIER FOR CATALYST COMPRISING METAL OXIDE-COATED METAL AND METHOD OF PREPARING SAME

[75] Inventors: Tsuyoshi Miyashita; Tamio Noguchi, both of Iwaki, Japan

[73] Assignee: Merck Patent Gesellschaft Mit Beschränkter Haftung, Darmstadt, Germany

[21] Appl. No.: 97,188

[22] Filed: Jul. 27, 1993

[30] Foreign Application Priority Data

Jul. 28, 1992 [JP] Japan ................................ 4-241124

[51] Int. Cl.⁶ ...................... B01J 21/08; B01J 23/74
[52] U.S. Cl. ................................. 502/258; 502/328; 502/336; 502/338; 502/349; 502/350; 502/439; 427/388.1
[58] Field of Search ............... 502/439, 338, 328, 309, 502/258, 336, 349, 350; 427/388.1

[56] References Cited

U.S. PATENT DOCUMENTS 4,584,280 4/1986 Nanao et al. ........................ 501/12
5,169,576 12/1992 Anderson et al. ................... 501/12
5,260,241 11/1993 Addiego et al. .................... 502/439

*Primary Examiner*—Anthony McFarlane
*Attorney, Agent, or Firm*—Millen, White, Zelano, & Branigan

[57] ABSTRACT

A porous carrier for a catalyst comprising metal coated with metal oxide grains having a mean grain size of 150 nm or less and a mean pore diameter of 5.5 nm or less, is obtained by subjecting:

(a) stainless steel;
(b) (i) a metal alkoxide or (ii) a metal alkoxide and a metal acetate salt, both being soluble in alcohols;
(c) a diol, cellosolve, or polyether which has coordinating capacity with the (i) metal alkoxide or (ii) metal alkoxide and metal acetate salt and which is soluble in alcohols; and
(d) an alcohol solvent to hydrolysis and polycondensation, whereby the stainless steel is coated with an oxygen-containing organic metal compound and, subsequently, heat-treated to form a metal oxide. A method of preparing the catalyst is also provided.

9 Claims, No Drawings

POROUS CARRIER FOR CATALYST COMPRISING METAL OXIDE-COATED METAL AND METHOD OF PREPARING SAME

FIELD OF THE INVENTION

The present invention relates to a carrier for a catalyst. More particularly, it relates to a porous carrier for a catalyst comprising metal oxide-coated stainless steel having high dispersibility of noble metal catalysts to be carried thereon and high impact resistance. The invention also relates to a method of preparing the carrier.

BACKGROUND OF THE INVENTION

Prior methods of producing a metal catalyst carrier by forming a porous metal oxide coating over the surface of stainless steel include:

(a) wash-coating, in which a particular stainless steel (Fe—Cr—Al series) is subjected to surface oxidation to form an $Al_2O_3$ coat thereover and is dipped (by the dipcoat method) in a slurry prepared by blending and stirring an active alumina powder, a wash-coat binder, aluminum nitrate, and water so that the coated stainless steel is additionally coated with the slurry (see *Nikkei New Material*, Nov. 28, 1988, page 25);

(b) dipping a metal network structure as a metal carrier in a benzene solution of a metal alkoxide and then in water and, thereafter, firing the thus-dipped structure; and (c) coating a paste of a metal oxide over a metal carrier, followed by drying (see Japanese Patent Application Laid-Open No. 54-122690).

Since the wash-coat method uses a metal oxide powder having large grains (mean grain size of from 0.01 μm to 30 μm), the adhesion between the surface of the stainless steel and the metal oxide coating is limited; and, in addition, the shape of the stainless steel to be used therein is limited to mesh, honeycomb, and plate shapes. Thus, the method is not always satisfactory. A further drawback is that the stainless steel to be used for applying the active alumina powder is limited to the Fe—Cr—Al series.

In accordance with the method described in Japanese Patent Application Laid-Open No. 54-122690, control of the pore diameter of the metal oxide grains is difficult, and the carrier obtained could hardly have a high dispersibility of noble metal catalysts therewith.

SUMMARY OF THE INVENTION

It has been found that uniform coating of a metal oxide composite over a metal is possible by using a polar compound when applying thereto by a sol-gel method or a hydrolyzing method a metal alkoxide, followed by heating to form a metal oxide via sol-gel conversion. It has also been found that the grain size and the pore diameter of the metal oxide grains of the coating may be controlled by this method. Specifically, the use of a polar compound having coordinating capacity makes the hydrolysis and polycondensation more moderate and also promotes the uniform distribution of many different metals. In addition, such a polar compound, when present before heating in the reaction system at a molecular level, scatters due to heating to form fine pores in the resultant metal oxide grains.

Accordingly, it is an object of the present invention to provide a porous carrier for a catalyst comprising a metal coated with metal oxide grains having a mean grain size of 150 nm or less and a mean pore diameter of 5.5 nm or less, obtained by subjecting the following components:

(a) stainless steel;

(b) (i) a metal alkoxide or (ii) a metal alkoxide and a metal acetate salt, said (i) metal alkoxide and (ii) metal alkoxide and metal acetate salt being soluble in alcohols;

(c) a diol, cellosolve, or polyether which has a coordinating capacity with said (i) metal alkoxide and (ii) metal alkoxide and metal acetate salt and which is soluble in alcohols; and (d) an alcohol solvent to hydrolysis and polycondensation, whereby the stainless steel is coated with an oxygen-containing organic metal compound, followed by heating the thus-coated stainless steel.

It is a further object to provide a method of preparing a porous carrier for a catalyst comprising a metal oxide-coated metal, wherein:

(a) stainless steel;

(b) (i) a metal alkoxide or (ii) a metal alkoxide and a metal acetate salt, said (i) metal alkoxide and (ii) metal alkoxide and metal acetate salt being soluble in alcohols;

(c) a diol, cellosolve, or polyether which has a coordinating capacity with said (i) metal alkoxide and (ii) metal alkoxide and metal acetate salt and which is soluble in alcohols; and (d) an alcohol solvent are:

blended;

water or a water-alcohol mixed solution are added dropwise to the resulting mixture with stirring, whereby the surface of the stainless steel is coated with the formed oxygen-containing organic metal compound; and thereafter, the solids are isolated from the resulting mixture, dried, and heated at 300°–1100° C.

Upon further study of the specification and appended claims, further objects and advantages of this invention will become apparent to those skilled in the art.

DETAILED DESCRIPTION OF THE PREFERRED EMBODIMENTS

The shape of the stainless steel to be used in preparing the porous carrier of the present invention is not specifically limited; for example, various spherical, flaky, mesh, honeycomb, are plate shapes are suitable.

Examples of stainless steel suitable for use in the present invention include the austenite series SUS 301, 304, and 304L and the ferrite series SUS 430, which could not be used as a metal carrier in the conventional wash-coat method, since an active alumina powder does not adhere thereto, as well as R20-5SR (produced by Kawasaki Steel Corporation), developed specifically so that an active alumina powder would adhere thereto. Use of such stainless steel is preferred in view of their heat resistance.

Polar compounds suitable for use in the present invention having coordinating capacity with metal alkoxides and metal acetate salts include diols, cellosolves, and polyethers. Suitable diols are, for example, ethylene glycol; trimethylene glycol; 1,4-butanediol; 1,5-petanediol; 1,6-hexanediol; and, preferably, 2-methyl-2,4-pentanediol. Suitable cellosolves are, for example, ethylene glycol monomethyl ether, diethylene glycol monomethyl ether, diethylene glycol monoethyl ether, and triethylene glycol monomethyl ether. Suitable polyethers are, for example, ethylene glycol dimethyl ether, diethylene glcyol dimethyl ether, diethylene glycol diethyl ether, and triethylene glycol dimethyl ether.

Among the metal alkoxides which can be used in forming the above-mentioned metal oxides in accordance with the present invention are, for example, titanium metal alkoxides, such as tetraisopropyl titanate, tetra-N-butyl titanate, and tetraethyl titanate; aluminum metal alkoxides, such as tri-sec.-butoxide aluminum, triethoxide aluminum, and triisopropoxide aluminum; silica alkoxides, such as tetraethoxysilane, methyltriethoxysilane, dimethyldimethoxysilane, dimethyldiethoxysilane, trimethylethoxysilane, and trimethylmethoxysilane; zirconium metal alkoxides, such as tetrapropoxide zirconium,; and magnesium metal alkoxides, such as dimethoxide magnesium and diethoxide magnesium. Due to their ease in handling, preferred metal alkoxides are tetraisopropyl titanate, tri-sec.-butoxide aluminum tetraethoxysilane, tetrapropoxide zirconium, and dimethoxide magnesium. Metal acetate salts suitable for use in the present invention include magnesium acetate and copper acetate.

Alcohol solvents to be used in the present invention include, for example, methanol, n-propanol, n-butanol, and, preferably, isopropyl alcohol and ethanol.

With respect to the method of preparing the porous carrier of the present invention, a polar compound having coordinating capacity, a metal alkoxide, and, optionally a metal acetate salt are added to an alcohol solvent. A stainless steel article is dipped in the resulting mixture solution, and water or a water-alcohol mixed solution is added dropwise thereto with stirring, whereby the water/water-alcohol mixed solution of the metal alkoxide containing the polar compound is subjected to hydrolysis and polycondensation to form an oxygen-containing organic metal compound over the surface of the stainless steel. The preferred metal alkoxide is a combination of a titanium alkoxide base and other metal alkoxide(s), which simplifies control of the reaction speed so that formation of the intended composite compound is easy. As a result, surface properties of the catalyst carrier may widely be controlled.

Where an additional coating is desired, a polar compound, an alcohol mixed solution of a metal alkoxide, and water or a water-alcohol mixed solution may be simultaneously added dropwise to the reaction system.

The amount of polar compound having coordinating capacity to be used in the method of the present invention has an important influence on the final catalyst carrier. Too much is undesirable, since a uniform oxygen-containing coating cannot be formed, and much more time is needed to carry out the method. Therefore, the amount of polar compound to metal alkoxide, as a molar ratio, may be from 0.1 to 10, and preferably 0.5 to 5.

It is desirable that the concentration of metal alkoxide in the alcohol, both as a reaction solution and as an alcohol solution to be added dropwise to the reaction solution, fall within the range of from 0.001 to 1 mol/liter, and preferably from 0.005 to 0.5 mol/liter. If the metal alkoxide concentration is less than 0.001 mol/liter, the amount of alcohol would be impracticably high. In contrast, if the metal alkoxide concentration is more than 1 mol/liter, the grain size of the oxygen-containing organic metal compound formed by hydrolysis-polycondensation would be too large, and a uniform coating layer could be not be obtained.

The temperature for mixing the polar compound and the metal alkoxide is desirably $\leq 80°$ C. If it is higher than 80° C., the polar compound and the metal alkoxide tend to form insoluble precipitates in an alcohol. The temperature for the hydrolysis-polycondensation reaction is from 20°–80° C. If it is lower than 20° C., the reaction speed of hydrolysis-polycondensation would be impracticably slow. In contrast, if it is higher than 80° C., the grain size of the oxygen-containing organic metal compound grains formed by the hydrolysis-polycondensation reaction would be too large and tend not to form a uniform coating layer when treated.

The amount of water necessary for hydrolysis is an important factor for gelation when forming oxygen-containing organic metal compound grains. For the alcohol-mixed solution containing a polar compound and a metal alkoxide, the amount of water is desirably the stoichiometric equivalent of the metal alkoxide, always from 0.5 to 2.0 mol/liter of alcohol to the alcohol in the system, and preferably the stoichiometric equivalent of the metal alkoxide and from 0.7 to 1.5 mol/liter of alcohol to the alcohol in the system. If the amount of water used for hydrolysis is less than the specified range, the hydrolyzing speed would be impracticably slow. In contrast, if it exceeds the specified range, the gelation speed would be too fast, resulting in an excess of free oxygen-containing organic metal compound not coating the surface of the stainless steel.

The time necessary for the dropwise addition of the water or water-alcohol mixed solution to the system may be from 0.2 to 8.0 hours, and preferably from 0.5 to 5.0 hours. If it is less than 0.2 hours, the gelation speed would be too fast, resulting in a significant amount of free oxygen-containing organic metal compound not coating the surface of the stainless steel. In contrast, a time longer than 8 hours for dropwise addition is impractical.

After addition of the water or water-alcohol mixed solution, the reaction system is stirred for another 0.2 to 8 hours for ripening.

Where stainless steel already coated with an oxygen-containing organic metal compound in an alcohol solvent is further coated with an additional oxygen-containing organic metal compound, a polar compound containing metal alkoxide-alcohol mixed solution is added thereto, whereupon it is desirable that the speed of feeding the solution be such that the amount of metal alkoxide to be added to the ripened system falls within the range of from $1.0 \times 10^{-5}$ to $1.0 \times 10^{-3}$ mol/min/liter of alcohol in the system. If the addition speed is lower than $1.0 \times 10^{-5}$ mol/min, the gelation speed would be too fast, and too much free oxygen-containing organic metal compound not coating the surface of the stainless steel is formed. In this step, the speed of addition of the water or water-alcohol mixed solution fed simultaneously to the system is kept constant. After addition, the system is stirred for an additional 0.2 to 2 hours for ripening.

Where a metal acetate salt is used in the method of the present invention, it may be substituted for a portion of the metal alkoxide.

The resultant oxygen-containing, organic metal compound-coated stainless steel is separated and recovered by an known method, such as filtration; dried at a temperature of from 30°–200° C., preferably from 60°–110° C.; and heated at a temperature of from 300°–1100° C., whereby the remaining polar compound is scattered. As a result, a metal carrier for a catalyst coated with a porous metal oxide is obtained. It is desirable for the heat-treatment temperature to be higher than the catalyst reaction temperature employed with the catalyst and carrier for the catalyst.

Observation with an SEM reveals that the resultant porous carrier for a catalyst comprising a metal oxide-coated metal is such that the surface of the stainless steel is coated with porous metal oxide grains, that the mean grain size of the coated grains is controlled to be 150 nm or less, preferably 5-150 nm. particularly 10-150 nm, and specifically 15-150 nm, and that the mean pore diameter of the grains, as measured by low temperature gas absorption method, is controlled to be 5.5 nm or less, preferably 1.5-5.5 nm, particularly 2.5-5.5 nm, and specifically 3-5.5 nm.

The porous carrier obtained can be loaded in a conventional way with any desired catalytically active material. The deposition of one or more metals selected from the Groups Ib and VIII of the Periodic Table is preferred. The concentration of the metals deposited usually ranges from 0.01-20%, and particularly from 0.5-5% by weight with respect to the mass of the porous carrier.

Without further elaboration, it is believed that one skilled in he art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents, and publications, cited herein, and of corresponding Japanese Patent Application No. 92-241124, are hereby incorporated by reference.

EXAMPLES

Example 1

100 g of SUS 304 stainless steel flakes (SP Ace, produced by Kawatetsu Techno-Research KK; mean thickness 0.3 μm, mean major diameter 30 μm, mean minor diameter 20 μm) were suspended in a mixed solution comprising 8.5 g (0.03 mol) of tetraisopropyl titanate, 7.1 g (0.06 mol) of 2-methyl-2,4-pentanediol and 900 ml of isopropyl alcohol. With stirring, the resulting solution was heated up to 70° C., and a mixed solution comprising 19.1 g (1.06 mol) of water and 100 ml of isopropyl alcohol was dropwise added thereto over a period of one hour. The concentration of tetraisopropyl titanate was 0.3 mol/liter (of isopropyl alcohol); and the amount of water of being 19.1 g was the stoichiometrically equivalent amount to tetraisopropyl titanate of being 0.06 mol and 1.0 mol corresponding to 1.0 mol/liter (of isopropyl alcohol), to the isopropyl alcohol of being one liter in the system. After dropwise addition, the system was stirred for further one hour at 70° C.; and a mixed solution comprising 28.3 g ( 0.10 mol) of tetraisopropyl titanate, 23.6 g (0.20 mol) of 2-methyl-2,4-pentanediol and 333 ml of isopropyl alcohol, and a mixed solution comprising 10.8 g ( 0.60 mol ) of water and 67 ml of isopropyl alcohol were simultaneously dropwise added thereto over a period of 5 hours. The feeding speed of tetraisopropyl titanate was $3.3 \times 10^{-4}$ mol/min to liter of the isopropyl alcohol in the suspension before the simultaneous dropwise addition; the tetraisopropyl titanate concentration in the dropping solution was 0.30 mol/liter (of isopropyl alcohol); and the amount of the water added of being 10.8 g was the stoichiometrically equivalent amount of being 0.20 mol and 0.40 mol corresponding to 1.0 mol/liter (of isopropyl alcohol), to the amount of the simultaneously added isopropyl alcohol of being 400 ml (333+67 ml). After dropwise addition, the whole was stirred for further 30 minutes at 70° C. and then filtered; and the oxygen-containing organic metal compound-coated carrier thus obtained was dried at 80° C. for 15 hours and thereafter heat-treated at 1000° C. for one hour to obtain a porous carrier for catalyst. The metal oxide layer of the thus obtained porous carrier was identified to contain titanium as uniformly distributed therein, by EDX (energy dispersion X-ray) analysis.

Example 2

The same process as in Example 1 was repeated, except that 7.1 g of the initially used 2-methyl-2,4-pentanediol was replaced by 1.8 g of diethylene glycol monomethyl ether and that 23.6 g of 2-methyl-2,4-pentanediol in the solution as added later was replaced by 6.0 g of diethylene glycol monomethyl ether, to obtain a porous carrier for catalyst. The metal oxide layer of the thus obtained porous carrier was identified to contain titanium as uniformly distributed therein, by EDX analysis.

Example 3

25 g of SUS 430 stainless steel flakes (SP Ace, produced by Kawatetsu Techno-Research KK; mean thickness 0.3 μm, mean major diameter 30 μm, mean minor diameter 20 μm) were suspended in a mixed solution comprising 2.8 g of tetraisopropyl titanate, 5.9 g of 2-methyl-2,4-pentanediol and 900 ml of isopropyl alcohol. With stirring, the resulting solution was heated up to 30° C., and a mixed solution comprising 14.4 g of water and 100 ml of isopropyl alcohol was dropwise added thereto over a period of 3 hours. After dropwise addition, the system was stirred for further 3 hours at 30° C.; and a mixed solution comprising 14.2 g of tetraisopropyl titanate, 29.5 g of 2-methyl-2,4-pentanediol and 500 ml of isopropyl alcohol, and a mixed solution comprising 10.4 g of water and 100 ml of isopropyl alcohol were simultaneously dropwise added thereto over a period of 72 hours. After dropwise addition, the whole was stirred for further 2 hours at 30° C. and then filtered; and the oxygen-containing organic metal compound-coated carrier thus obtained was dried at 80° C. for 15 hours and thereafter heat-treated at 500° C. for one hour to obtain a porous carrier for catalyst. The metal oxide layer of the thus obtained porous carrier was identified to contain titanium as uniformly distributed therein, by EDX analysis.

Example 4

The same process as in Example 1 was repeated, except that 8.5 g of the initially used tetraisopropyl titanate was replaced by 4.3 g of tetraisopropyl titanate, 1.5 g of tri-sec-butoxide aluminium, 2.8 g of 70% tetrapropoxide zirconium-containing propanol solution (tetrapropoxide zirconium content: 2.0 g) and 2.5 g of 10.3% dimethoxide magnesium-containing methanol solution (dimethoxide magnesium content: 0.26 g) and that 28.3 g of tetraisopropyl titanate in the solution as added later was replaced by 14.2 g of tetraisopropyl titanate, 4.9 g of tri-sec-butoxide aluminium, 9.4 g of 70% tetrapropoxide zirconium-containing isopropyl alcohol solution (tetrapropoxide zirconium content: 6.6 g) and 8.4 g of 10.3% dimethoxide magnesium-containing methanol solution (dimethoxide magnesium content: 0.87 g), to obtain a porous carrier for catalyst. The metal oxide layer of the thus obtained porous carrier was identified to contain titanium, aluminium, zirconium and magnesium as uniformly distributed therein, by EDX analysis.

Example 5

100 g of SUS 430 stainless steel flakes (SP Ace, produced by Kawatetsu Techno-Research KK; mean thickness 0.3 μm, mean major diameter 30 μm, mean minor diameter 20 μm) were suspended in a mixed solution comprising 28.3 g of tetraisopropyl titanate, 0.36 g of copper acetate, 40.3 g of diethylene glycol dimethyl ether and 1100 ml of ethanol. With stirring, the resulting solution was heated up to 50° C., and a mixed solution comprising 36.4 g of water and 300 ml of ethanol was dropwise added thereto over a period of 5 hours. After dropwise addition, the system was stirred for further 7 hours at 50° C. and then filtered. The thus obtained oxygen-containing organic metal compound-coated carrier was dried at 80° C. for 15 hours and then heat-treated at 500° C. for one hour to obtain a porous carrier for catalyst. The metal oxide layer of the thus obtained porous carrier was identified to contain titanium and copper as uniformly distributed therein, by EDX analysis.

Example 6

70 mm × 1 m SUS 304 stainless steel mesh (325 mesh) was dipped in a mixed solution comprising 3.2 g of tetraisopropyl titanate, 2.6 g of 2-methyl-2,4-pentanediol and 900 ml of alcohol, in the form of a ring. With stirring, the solution was heated up to 70° C., and a mixed solution comprising 18.4 g of water and 100 ml of isopropyl alcohol was dropwise added thereto over a period of 3 hours. After dropwise addition, the system was stirred for further 5 hours at 70° C. and then filtered, and the thus obtained oxygen-containing organic metal compound-coated carrier was taken out from the solution, dried at 80° C. for 15 hours and then heat-treated at 500° C. for one hour to obtain a porous carrier for catalyst. The metal oxide layer of the thus obtained porous carrier was identified to contain titanium as uniformly distributed therein, by EDX analysis.

Example 7

The same process as in Example 6 was repeated, except that 3.2 g of tetraisopropyl titanate was replaced by 2.8 g of tetraisopropyl titanate and 0.21 g of tetraethoxysilane, to obtain a porous carrier for catalyst. The metal oxide layer of the thus obtained porous carrier was identified to contain titanium and silica as uniformly distributed therein, by EDX analysis.

Example 8

50 sheets of precision-rolled SUS 304 stainless steel strip (mean thickness 50m μm; 100 mm × 50 mm) and 50 sheets of waved strip from the same stainless steel strip were simultaneously dipped in a mixed solution comprising 9.9 g of tetraisopropyl titanate, 3.7 g of tri-sec-butoxide aluminium, 11.8 g of 2-methyl-2,4-pentanediol and 1800 ml of isopropyl alcohol, with the top of them being fixed. With stirring, the solution was heated up to 70° C., and a mixed solution comprising 37.8 g of water and 200 ml of isopropyl alcohol was dropwise added thereto over a period of 2 hours. After dropwise addition, the system was stirred for further 3 hours at 70° C., and the thus obtained oxygen-containing organic metal compound-coated carrier was taken out from the solution, dried at 80° C. for 15 hours and then heat-treated at 900° C. for one hour to obtain a porous carrier for catalyst. The metal oxide layer of the thus obtained porous carrier was identified to contain titanium and aluminium as uniformly distributed therein, by EDX analysis.

Comparative Example 1

The same process as in Example 1 was repeated, except that 2-methyl-2,4-pentanediol was not used, to obtain a carrier for catalyst.

The physical properties of the catalyst carriers as obtained in Examples 1 to 3 and Comparative Example 1 were measured, and the results are shown in Table 1 below.

TABLE 1

| Number of Example of Catalyst Carrier Obtained | Physical Properties of Porous Carrier for Catalyst | | |
|---|---|---|---|
| | mean grain size (nm) of coated metal oxide grains | mean pore diameter (nm) of coated metal oxide grains | pore capacity (ml/g) of porous carrier |
| Example 1 | 100 | 4.5 | 0.010 |
| Example 2 | 120 | 5.0 | 0.009 |
| Example 3 | 20 | 3.6 | 0.015 |
| Comparative Example 1 | 170 | 6.2 | 0.007 |

Use Example 1

Using each catalyst carrier as obtained in Example 1 and Comparative Example 1, catalysts were prepared in the manner mentioned below and the catalyst activity of each catalyst was measured.

Method of Preparing Catalyst 10 g of a catalyst carrier and chloroplatinic acid hexahydrate (0.265 g for preparing 1% Pt catalyst; 0.0265 g for preparing 0.1% Pt catalyst) were added, blended and suspended in 250 ml of an aqueous 0.1 mol/liter NaOH solution. With stirring, a mixed solution comprising 0.1 g of NaBH4 and 25 ml of an aqueous 0.1 mol/liter NaOH solution was dropwise added thereto and stirred for further 1.5 hours. Then, a hydrochloric acid solution was added thereto to decompose the excess NaBH$_4$. After filtered and washed with water, the catalyst thus formed was dried at room temperature for 24 hours.

Method for Testing Catalyst Activity 7 g of the catalyst prepared above was filled in a normal pressure fixed bed flow type reactor tube and isopropyl alcohol gas formed by applying 100 ml/min of nitrogen gas to isopropyl alcohol under heat at 70° C.

was introduced into the reactor, whereupon acetone as formed by reduction reaction at a temperature of 200° C. was determined by gas chromatography.

Test Result of Catalyst Activity Test

Using a catalyst sample as prepared by the use of the catalyst carrier of Example 1 or Comparative Example 1 and a commercial carrier having almost the same mean grain size as the sample, the acetone yield was determined. The results obtained are shown in Table 2.

TABLE 2

| Kind of Catalyst Tested | 1% Pt-carrying $Al_2O_3$ | 1% Pt-carrying carrier of Example 1 | 0.1% Pt-carrying carrier of Example 1 | 0.1% Pt-carrying carrier of Comparative Example 1 |
|---|---|---|---|---|
| Acetone Yield | 31% | 42% | 36% | 5% |

From the test results, it was confirmed that the porous carrier as obtained in Example 1 gave a catalyst having a high catalyst activity even though the amount of Pt as carried therewith was small. The catalyst as obtained by adding Pt to the porous carrier of Example 1 was identified to have Pt as uniformly distributed therein, by EDX analysis.

Use Example 2

Using each of the porous catalyst carriers as obtained in Examples 6 and 7, catalysts were prepared in the same manner as in Use Example 1. Each of the thus prepared catalysts was applied to a gasoline engine, where the purification yields of HC, CO and NO in an exhaust gas were measured in an oxygen-excess atmosphere in which the air-fuel ratio was in the lean side.

Purification Test Results

A catalyst sample to be tested was set in an exhaust system of a 4-cycle air-cooling 162 cc-engine, and a purification test was carried out under the condition of an air-fuel ratio (A/F) of being 22, an exhaust gas flow rate, per g of catalyst, of being 150000 cc/g.h and a catalyst bed temperature of being 450° C. The test results obtained are shown in Table 3 below.

TABLE 3

| Kind of Catalyst Tested | 0.2% Pt-carrying Carrier of Example 6 | 0.2% Pt-carrying Carrier of Example 7 |
|---|---|---|
| HC Purification Yield | 99% | 87% |
| CO Purification Yield | 99% | 84% |
| NO Purification Yield | 18% | 24% |

From the test results obtained above, it is understood that the catalysts as obtained by applying Pt to the carriers of Example 6 and Example 7 of the present invention were effective for highly purifying HC, CO and NO even in the oxygen-excess atmosphere where the air-fuel ratio was in the lean side. In addition, the catalysts as obtained by applying Pt to the carriers were identified to have Pt as uniformly distributed therein, by EDX analysis.

Use Example 3

Using the catalyst carrier of Example 8, a catalyst was prepared in the same manner as in Use Example 1 (where rhodium chloride trihydrate was partly used in combination). Using the catalyst thus prepared, the purification yields of HC, CO and NO in a model gas having a theoretical air-fuel ratio of being 14.6 were measured.

Purification Test Results

Flat tabular catalysts and waved tabular catalysts were alternately laminated and filled in a normal pressure fixed bed flow type reactor tube, into which a model gas having a theoretical air-fuel ratio (A/F) of being 14.6 was introduced at a space velocity (SV) of being 50000 $h^{-1}$ and at a temperature of 850° C. for 5 hours. After cooled to room temperature, the same model gas was introduced thereinto at a space velocity (SV) of being 50000 $h^{-1}$ whereupon the purification yields of HC, CO and NO were measured at a reaction temperature of 450° C., 650° C. and 850° C.

The test results obtained are shown in Table 4 below.

TABLE 4

| Kind of Catalyst Tested | 0.2% (Pt-Rh) carrying carrier of Example 8 (Pt/RH = 3/1) | | |
|---|---|---|---|
| Reaction Temperature (°C.) | 450 | 650 | 850 |
| HC Purification Yield (%) | 92 | 99 | 99 |
| CO Purification Yield (%) | 90 | 96 | 99 |
| NO Purification Yield (%) | 99 | 99 | 98 |

From the test results obtained above, it is understood that the catalyst as obtained by applying Pt-Rh to the carrier of Example 8 of the present invention was effective for highly purifying HC, CO and NO under the condition of a theoretical air-fuel ratio of 14.6 and a temperature of from 450 to 850° C. In addition, the catalyst as obtained by applying Pt—Rh to the porous carrier was identified to have Pt and RH as uniformly distributed therein, by EDX analysis.

The porous carriers for catalyst as obtained in the abovementioned examples of the present invention were identified, by SEM observation, to have metal oxide grains having a mean grain size of 150 nm or less as uniformly coated over the metal base. The metal oxide grains were measured, by a gas absorption method, to have a mean pore diameter of 5.5 nm or less, and the metals in the coated layer was confirmed to be uniformly distributed therein, by EDX analysis. Where each of the porous carriers as obtained in Examples 1 to 5 was stirred in a mixer and where each of the porous carriers as obtained in Examples 6 to 8 was bent with the hands, the coated metal oxide grains were not peeled from the metal base.

As opposed to them, where a part of a commercial metal honeycomb catalyst (as set in cars manufactured by Nissan) was cut and bent with the hands, the coated layer was peeled off from the metal base.

Advantage of the Invention

Since the porous carrier for catalyst of the present invention, which comprises a metal oxide-coated metal, has fine pores with high uniformity and regularity, the dispersibility of noble metals such as platinum group metals therewith is high. The catalyst as prepared by combination of such noble metals and the carrier of the present invention was found to display a particular effect in catalytic reaction of oxidation or reduction. Using the porous carrier of the present invention, therefore, multi-functional catalysts with high selectivity are prepared.

In the porous carrier for catalyst of the present invention, the adhesiveness of the metal oxide coat to the metal base is high and the impact resistance of the coated carrier is high. Therefore, the carrier is especially useful for forming catalysts to be dynamically used for treating an exhaust gas from car engines.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A porous carrier for a catalyst comprising a metal coated with metal oxide grains having a mean grain size of 150 nm or less and a mean pore diameter of 5.5 nm or less, obtained by subjecting the following components:
    (a) stainless steel;
    (b) (i) a metal alkoxide or (ii) a metal alkoxide and a metal acetate salt, said (i) metal alkoxide and (ii) metal alkoxide and metal acetate being soluble in alcohols;
    (c) a diol, cellosolve, or polyether which has coordinating capacity with said (i) metal alkoxide or (ii) metal alkoxide and metal acetate salt and which is soluble in alcohols; and
    (d) an alcohol solvent to hydrolysis and polycondensation, whereby the stainless steel is coated with an oxygen-containing organic metal compound and, thereafter, heat-treated to form a metal oxide.

2. The carrier of claim 1, in which the metal alkoxide is an alkoxide of a metal selected from the group consisting of titanium, aluminum, silica, zirconium, and magnesium.

3. A method of preparing a porous carrier for a catalyst, comprising a metal oxide-coated metal, wherein:
    (a) stainless steel;
    (b) (i) a metal alkoxide or (b) a metal alkoxide and a metal acetate salt, said (i) metal alkoxide and (ii) metal alkoxide and metal acetate being soluble in alcohols;
    (c) a diol, cellosolve, or polyether which has a coordinating capacity with said (i) metal alkoxide or (ii) metal alkoxide and metal acetate salt and which is soluble in alcohols; and
    (d) an alcohol solvent are:
    blended;
    water or a water-alcohol mixed solution is added dropwise to the resulting mixture with stirring to form a coating of an oxygen-containing organic metal compound on the surface of the stainless steel;
    thereafter, the coated stainless steel is isolated from the reaction mixture, dried, and heat-treated at 300°–1100° C.

4. The method of claim 3, in which, after water or water-alcohol solution has been added dropwise to the reaction mixture with stirring, an alcohol-mixed solution of the substances of (b) and (c) and water or a water-alcohol mixed solution are simultaneously added dropwise with stirring to form a coating of an oxygen-containing organic metal compound on the surface of the stainless steel and, thereafter, the coated stainless steel is isolated from the reaction mixture, dried, and heat-treated at 300°–1100°.

5. A catalyst comprising the porous carrier of claim 1 onto which one or more metals selected from Group Ib and Group VIII of the Periodic Table are deposited.

6. The carrier of claim 1, wherein the metal comprises stainless steel, and the mean grain size of the metal oxide falls within the range of 20–150 nm and the mean pore diameter falls within the range of 3.6–5.5 nm.

7. The carrier of claim 6, wherein the stainless steel is an article having a spherical, flaky, mesh, homogeneous, or plate shape.

8. The method of claim 3, wherein the metal alkoxide is selected from the group consisting of titanium metal alkoxides, aluminum metal alkoxides, silica alkoxides, zirconium metal alkoxides, and magnesium metal alkoxides; the metal acetate salt is selected from the group consisting of magnesium acetate and copper acetate; the diol is selected from the group consisting of 2-methyl-2,4-pentanediol, ethylene glycol, trimethylene glycol, 1,4-butanediol, 1,5-pentanediol, and 1,6-hexanediol; the cellosolve is selected from the group consisting of ethylene glycol monomethyl ether, diethylene glycol monomethyl ether, diethylene glycol monoethyl ether, and triethylene glycol monomethyl ether; the polyether is selected from the group consisting of ethylene glycol dimethyl ether, diethylene glycol dimethyl ether, diethylene glycol diethyl ether, and triethylene glycol dimethyl ether; and the alcohol solvent is selected from the group consisting of n-propanol, n-butanol, isopropyl alcohol, and ethanol.

9. The carrier of claim 1, onto which is deposited one or more metals selected from the group consisting of Ni, Pd, Co, Fe, Rh, Cu, Ag, and Au.

* * * * *